United States Patent Office 3,353,665
Patented Nov. 21, 1967

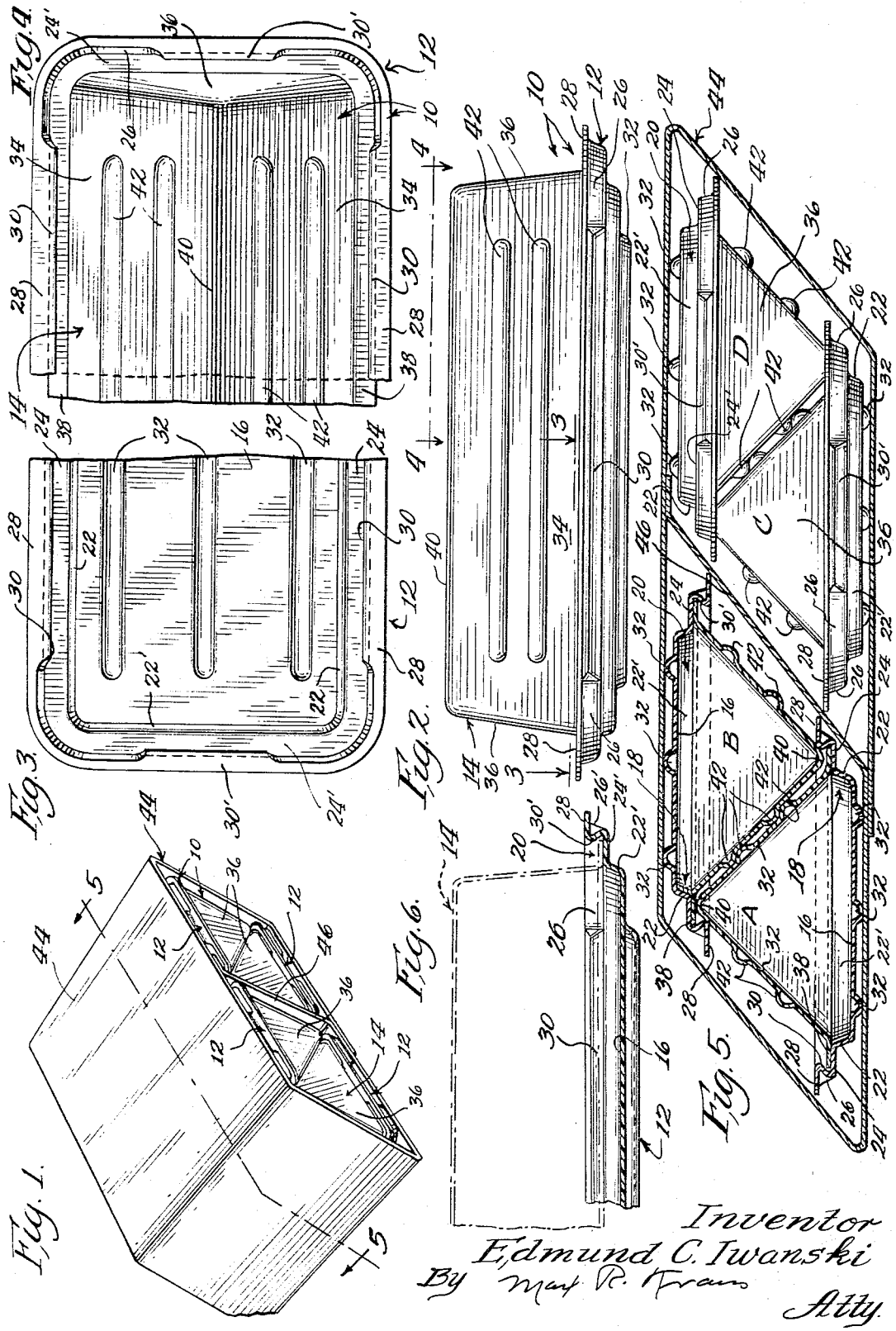

3,353,665
CONTAINERS AND A PACKAGE FORMED
OF SUCH CONTAINERS
Edmund C. Iwanski, 5362 N. Nottingham Ave.,
Chicago, Ill. 60656
Filed Mar. 17, 1964, Ser. No. 352,608
7 Claims. (Cl. 206—65)

This invention relates to a container and to a package formed of such containers.

One of the objects of this invention is to provide a container which may serve a twofold purpose, namely, to serve as a container for the product in which the product may be packaged, transported and distributed, and also, when in use may serve as a serving dish for the product, in the home, in restaurants, and the like.

Another object of this invention is to provide a container for plastic food products, such as butter, cheese, margarine, and the like, which container with the food product is packaged with other similar containers in a single compact arrangement, in which manner it is sold, and distributed, and wherein the individual container is used as a serving dish for the food product.

In the sale of butter, margarine and other like plastic-type food products, the food product is packaged so that when it is removed from its original package it is normally placed in a separate serving dish in which manner it is served on the table and stored in the refrigerator between uses. The present invention eliminates the need of a separate serving dish in that a very simple and inexpensive container is provided for the food product which permits packaging and shipment of the food product in said container and which also provides a serving dish for the product in which it may be served and also stored in the refrigerator.

Another object of this invention is to provide improved means for packaging, shipping and distributing food products and the like, wherein the food product is fully protected during such handling and in which the container used in such handling becomes the serving tray for the food product during its use.

The cost of packaging food products in accordance with this invention is in the same order as the cost incurred in present-day packaging methods without the benefit of an individual serving dish for the packaged product. With no increase in cost, this invention provides a container which can be used as a serving dish in addition to its use as a packaged product and in which the food is better protected while in its packaged condition before use.

Other objects will become apparent as this description progresses.

In the drawings:

FIG. 1 is a perspective view of the package, packaged with four of the containers, with the end wall of the package removed to show the position of the containers.

FIG. 2 is a side elevational view of one of the individual containers.

FIG. 3 is a top plan view taken on lines 3—3 of FIG. 2, showing the base member of the individual containers.

FIG. 4 is a top plan view taken on lines 4—4 of FIG. 2, showing the removable cover interlocked with the base member.

FIG. 5 is a sectional view of the package taken on lines 5—5 of FIG. 1, showing the individual containers interlocked in the package arrangement, and FIG. 6 is a sectional view of the base member.

The individual container, generally designated at 10, is formed of a base member generally indicated at 12, and a cover generally indicated at 14 detachably secured to the base member. Each container 10 is a separate unit which individually houses a plastic material, such as butter, margarine, and the like, and is packaged with other like individual containers in a single package, yet, when withdrawn from the package each container unit forms a serving dish which is placed on the table for serving the butter, or the like, without the necessity of removing the butter from the package and placing it in an individual serving dish.

The base member 12 is of a generally rectangular shape and has a bottom wall 16 and integrally connected upright side walls 18 and end walls 20. The side and end walls are each stepped, that is, they are formed to provide two horizontal flat surfaces, with the intermediate horizontal flat surfaces forming the ledge for the cover member. More specifically, as best shown in FIG. 5, the side wall 18 has an upwardly extending section 22, an intermediate horizontal outwardly extending section 24, an upwardly vertically extending rim section 26, and an outwardly horizontally extending flange 28. The upwardly extending rim 26 has an inwardly tapering wall 30 for a portion of its length, which tapering wall serves to detachably secure the outwardly extending flange of the cover, presently to be described. The end walls 20, being continuations of the side walls, are similarly shaped and have identical sections and flanges, best shown in FIG. 6, and are indicated by the same numbers primed. The side and end walls 18 and 20 may also be characterized as stepped walls by reason of their step-shape formation. The tapering wall 30 on the side sections 26 extend along the major portion of the length of the side wall, while the corresponding tapered wall 30' on the end wall 26' has a relatively shorter length. The bottom wall 16 is provided with spaced longitudinally extending ribs 32.

The removable cover 14 is of substantially triangular shape, having equal sloping side walls 34 joined by sloping end walls 36. It may also be characterized as of a wedge-shape in section. The side and end walls continue outwardly to form a continuous horizontally extending lip or flange 38 which extends along the sides and ends of the cover 14. The apex of the cover is indicated by the numeral 40. The side walls of the cover are each provided with spaced longitudinally extending ribs 42.

Both the base and removable cover are formed preferably of a plastic material having a .010 thickness. The base may be opaque and the cover is preferably transparent, although this may be varied to suit the particular need. Each container is of a size to contain approximately ¼ pound of butter or like material. Each container is utilized as a serving dish for the butter or margarine which is packed in the container. For example, the butter, or other plastic food product, would be of triangular shape and would be supported in the base. The side and end walls of the base, particularly the sections 22 and 22' thereof would serve to confine the butter in the base member. The cover is readily detachably secured to the base so that when attached the butter or food product is completely enclosed and covered, as will be seen in FIG. 5.

The cover 14 is detachably secured to the base 12 by means of the laterally extending lip 38 of the cover, which engages the inwardly inclined wall members 30 and 30' on the sides and ends of the base. When the cover is in proper position on the base the lip 38 rests on the horizontal intermediate section 24 of the base and the lip 38 engages the underside of the tapered wall 30 and 30' to firmly hold the removable cover in position with respect to the base. Due to the give or resiliency of the plastic material, both as to the base and to the cover, the cover may be compressed slightly to permit the lips 38 to pass the tapered walls and end members and to interlock at the bottom thereof, as shown in FIG. 5, to hold and retain the cover with respect to the base.

In addition to being utilized as a serving dish, the container unit may be packed with similar units in a package to form a compact easily handled package. For example, four of such containers containing the butter or margarine product may be conveniently packed to form a one pound package, or, two containers 10 may be packed to form a ½-pound package. Whichever packaging is used, same may be easily stored in the refrigerator in the home or in the store.

As best shown in FIGS. 1 and 5, the individual container units 10 when packaged in a complete package are so positioned that the cover 14 of one container unit interlocks with the base 12 of the adjacently positioned unit and the longitudinally extending ribs 32 on the side walls of the cover are engaged by the ribs 32 of the adjacent cover member. As shown in FIGS. 1 and 5, four of the container units are positioned inside a cardboard container or carton 44 to form a single package, which package is shaped to form a parallelogram. One of the container units 10, identified by the letter A in FIG. 5, is positioned in a normal upright position, as shown. The container unit B, which is identical to unit A, is positioned in said packaged container in an inverted position in which the apex 40 of unit B rests on the horizontal lip 38 of the cover member of unit A between the inclined side wall 32 of the cover and the tapered wall 30 of the base. The side wall 32 of the cover of unit A is adjacent the side wall 32 of the cover of unit B, with the longitudinally extending ribs 42 of the cover of unit A positioned contiguous to the longitudinally extending ribs of the cover of unit B. The apex 40 of the cover of unit A will be similarly positioned against the cover and base of inverted unit B. Thus, as shown, when two units are positioned, one is inverted relative to the other and the apex of the cover of one nests within the base portion of the other; also, the apex of one rests against the lip of the cover portions of the other, which helps and serves to prevent the covers from becoming detached from their respective bases while the units are in the packaged condition. A package may be formed with only two container units positioned, one inverted relative to the other, to form a parallelogram-shaped package. However, in most instances it is preferred that four of such container units be packaged as a single unit and the two additional container units are positioned in the same package in the same relationship as units A and B and these units are identified as units C and D in FIG. 5. When the four units are positioned in a single package a parallelogram package is formed, as shown.

Between the units A, B and C, D is positioned a partition or dividing strip 46 formed of the paper carton. The partition is attached both to the top and bottom walls of the carton and serves to divide the interior of the packaged container and also more properly maintains the pairs of containers in proper position during shipment of same. For clarity, the side walls of the carton 44, shown in FIG. 1, have been removed, although it will be understood that to completely enclose the container units 10 therewithin, side walls are formed in the paper cartons which would enclose the ends of the four container units. The end walls of the carton 44 are flaps which are opened to permit removal of the individual container units from the carton with the food product therein.

This invention provides a very simple and inexpensive container unit which is utilized as a serving dish for the food product and also as a container for packaging, shipping and storing. Each individual container serves as a serving dish for the butter or the like when it is removed from the carton or packaged container and it may be readily stored in the refrigerator and removed therefrom and placed on the table.

It will be understood that various changes and modifications may be made from the foregoing without departing from the spirit and scope of the appended claims.

What is claimed is:

1. A package comprising a plurality of individual container units, each container unit having a base and a removable cover detachably secured to said base, said cover having equal sloping side walls converging toward a central apex at the uppermost portion and forming a wedge shape in section, said cover having an outwardly extending flange, said base having stepped side walls with the flange of the cover resting on one of the steps of said stepped walls and detachably secured thereto, said container units being positioned relative to each other so that one unit is inverted with respect to the other, with the apex of the cover of one unit resting inside the stepped side wall of the adjacent unit and on the outwardly extending flange of the base and with the side wall of one cover contiguous to the side wall of the adjacent cover.

2. A package defined in claim 1 in which there are four container units forming a parallelogram.

3. A structure defined in claim 1 in which the side walls of the cover member are provided with spaced longitudinally extending ribs so that with respect to each two units when one unit is inverted with respect to the other and the side wall of one cover member is adjacent the side wall of the adjacent cover member the ribs of one cover member will be in engagement with the ribs of the adjacent cover member.

4. A package defined in claim 1 in which the plurality of container units are enclosed within a wrapper which forms a parallelogram.

5. A package defined in claim 1 in which the covers each have a longitudinally extending rib, with the rib of one cover engaging the rib of the adjacent cover.

6. A package formed of a plurality of container units, each unit comprising a plastic container molded from yieldable plastic material comprising, a base member and a cover adapted to be releasably joined to said base member, said base member having a bottom wall integrally connected with upright and oppositely disposed side and end walls, said side and end walls being stepped to provide a lower upwardly extending section merging with an intermediate outwardly horizontally extending section which merges with an upwardly extending rim, said upwardly extending rim having an inwardly extending tapering wall portion, said cover having equal sloping side walls converging towards a central apex at the uppermost portion and forming a wedge shape in section, said cover having a horizontally disposed outwardly extending flange at the bottom thereof, said flange adapted to rest on the intermediate outwardly extending sections of the side and end walls of the base and to interengage with the tapering walls to releasably secure said cover to said base, said upwardly extending rim of the base member spaced outwardly of the side walls of the cover providing a space between the rim and the side walls, said space receiving the apex of the cover of an inverted container unit, with the side wall of one cover adjacent the side wall of the cover of the inverted unit.

7. A package formed as defined in claim 6 in which the side walls of the cover each have a longitudinally extending rib with the rib of one cover engaging the rib of the adjacent cover.

References Cited

UNITED STATES PATENTS

| D. 200,555 | 3/1965 | Iwanski | 229—22 |
|---|---|---|---|
| 200,003 | 2/1878 | Sprowles. | |
| 2,560,761 | 7/1951 | Ferguson | 206—65 X |
| 2,633,269 | 3/1953 | Hirschhorn. | |
| 2,814,381 | 11/1957 | Stevick | 206—45.34 |
| 2,889,920 | 6/1959 | Andress | 206—45.34 |
| 3,056,494 | 10/1962 | Reifers et al. | |
| 3,107,204 | 10/1963 | Brown et al. | 206—72 |

LOUIS G. MANCENE, *Primary Examiner.*